United States Patent [19]

Rapp

[11] Patent Number: 4,874,979
[45] Date of Patent: Oct. 17, 1989

[54] ELECTROMECHANICAL TRANSLATION APPARATUS

[75] Inventor: Louis N. Rapp, Dansville, N.Y.

[73] Assignee: Burleigh Instruments, Inc., Fishers, N.Y.

[21] Appl. No.: 253,162

[22] Filed: Oct. 3, 1988

[51] Int. Cl.$^4$ ............................................. H01L 41/08
[52] U.S. Cl. ................................... 310/328; 310/366; 310/369
[58] Field of Search ................ 310/317, 323, 328–332, 310/366, 369

[56] References Cited

U.S. PATENT DOCUMENTS

| | | | |
|---|---|---|---|
| 3,902,084 | 8/1975 | May | 310/328 |
| 3,902,085 | 8/1975 | Bizzigotti | 310/328 |
| 4,163,168 | 7/1979 | Ishikawa et al. | 310/328 |
| 4,468,583 | 8/1984 | Mori | 310/328 |
| 4,570,096 | 2/1986 | Hara et al. | 310/328 |

OTHER PUBLICATIONS

Gregory et al., J. Vac. Sci. Tech., A6(2), Mar./Apr. 1988, 390.
Binnig et al., IBM. J. Res. Devel. 30, Jul. 4, 1986, 355.
Chiang et al., J. Vac. Sci. Tech., A6(2), Mar./Apr. 1988, 386.
Demuth et al., IBM J. Res. Develop., 30, Jul. 4, 1986, 396.
Burleigh Instr. Inc., Inchworm (R) Brochure, IW2501080, 1983.

Primary Examiner—Mark O. Budd
Attorney, Agent, or Firm—Martin LuKacher

[57] ABSTRACT

An electromechanical translator apparatus (24) which is especially suitable for use as the coarse positioner in a scanning tunneling microscope (10) (STM) which enables a specimen to be positioned with a resolution in the order of atomic distances (in the nanometer range) has a housing (26) containing a piezoelectric driver in the form of a sleeve (32) surrounding a shaft (21) on one end of which the specimen (18) may be mounted. The driver sleeve (32) has an extension element (2) with clamping elements (1, 3) on opposite ends thereof and is connected and referenced to the housing at a region (4) thereon spaced from the extension element and preferably between the extension element (2) and the one of the clamping elements (1) closest to the end of the shaft (22) on which the specimen (18) is mounted (in the direction of controlled movement toward the scanning tip (16) of the STM). Because of the position of the connection (36) and referencing of the housing (26) undesired movement of the shaft such as upon engagement and releasing of the clamping elements (glitch movement) or due to piezoelectric material creep effects or spurious movement of the shaft (21) due to power supply noise, which changes the voltage applied to the extension element, is avoided thereby enabling controlled motion with resolution in the range required for STM applications and other applications which require high resolution controlled motion.

6 Claims, 3 Drawing Sheets

DIRECTION OF CONTROLLER MOTION

WORKING POSITION FOR STM

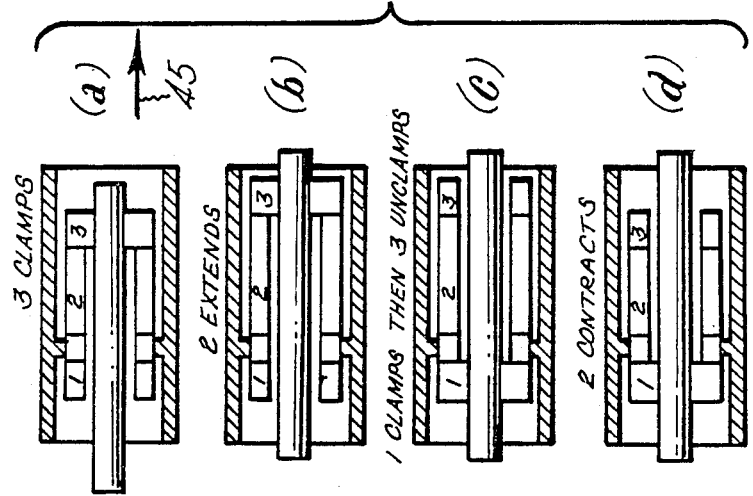
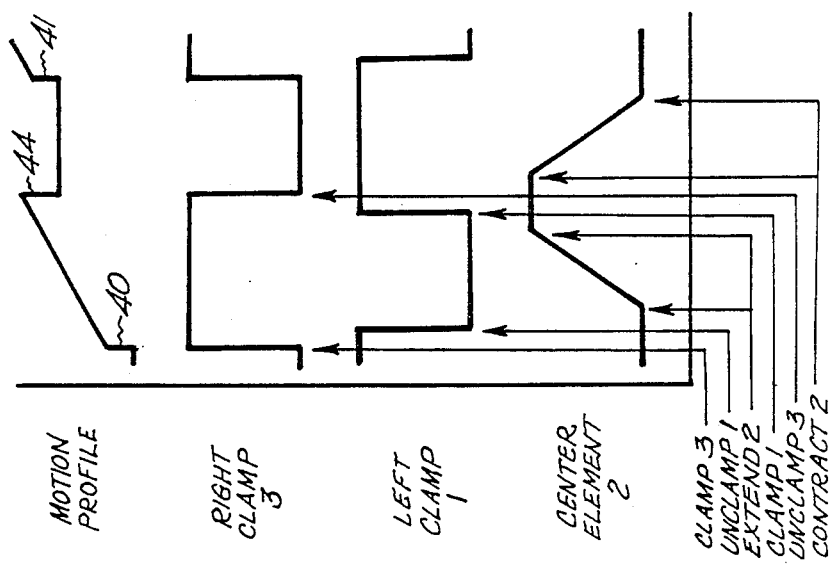

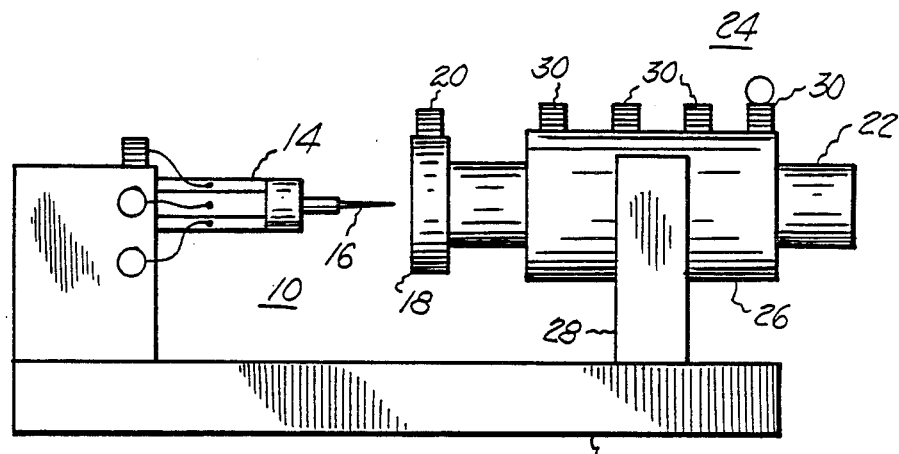
Fig. 5
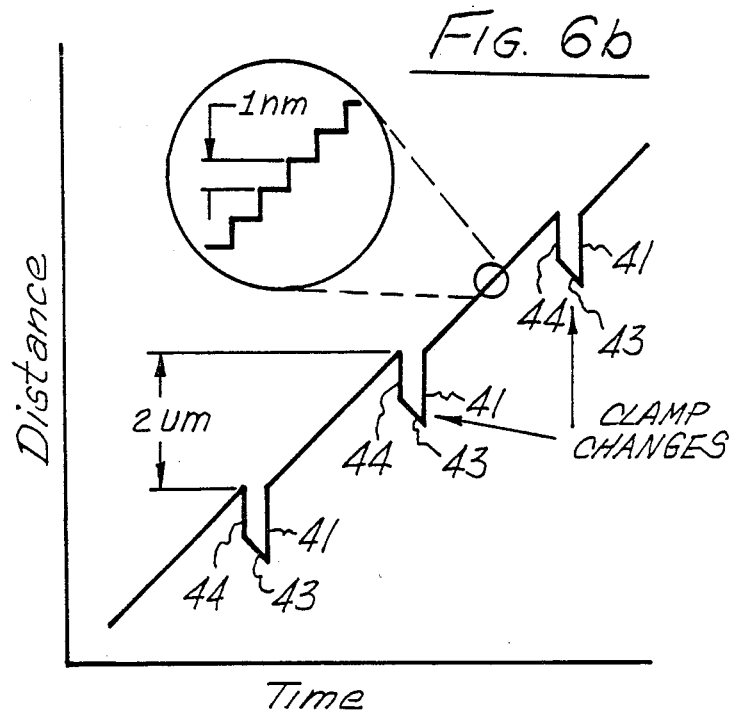
Fig. 6b
Fig. 6a

ELECTROMECHANICAL TRANSLATION APPARATUS

DESCRIPTION

The present invention relates to electromechanical translators which operate by peristaltic action and particularly to piezoelectric electromechanical translation apparatus utilizing a piezoelectric driver having clamping and extension sections for translating a shaft.

The invention is especially suitable for use in a scanning tunneling microscope (STM) as well as other apparatus which requires resolution of translation to very high degrees of accuracy, which in the case of the STM is at the atomic level (in the nanometer (nm) range).

In an STM tunneling is achieved after a scanning tip and sample are brought within very close proximity to each other with a gap which is maintained stable in order for the microscope to image at the atomic level. In addition STMs can be high vacuum instruments and the apparatus used therein should be compatible with the ultra high vacuum (UHV) environment. Reference may be had to a paper by G. Binnig and H. Rohrer entitled "Scanning Tunneling Microscope", IBM J. Res. Develop., Vol. 30, No. 4, July, 1986, pages 355 to 369 for general information on STMs and a description of coarse positioners (which may go by the name of louse, walker or maggot) which are used in such apparatus to obtain the positioning resolution required. An article by J. E. Demuth entitled a "Scanning Tunneling Microscope for Surface Science Studies" which appeared in this IBM J. Res Develop. Vol. 30, No. 4, July 1986 on pages 396 through 402 shows and describes a lever mechanism designed for use as a coarse positioner. The louse or walker is a piezoelectric device with special vibration dampers as shown in greater detail in an article by S. Chiang et al entitled "An Ultra High Vacuum Scanning Tunneling Microscope With Interchangeable Samples And Tips" which appeared in the J. Vac. Sci. Technol. A6(2), March/April, 1988 pages 386 through 389. Another walker consisting of piezoelectric bimorphs and stacks of piezoelectric elements is described in an article by S. Gregory et al entitled "High-Speed Scanning Tunneling Microscopes" which appeared in the J. Vac. Sci. Technol. A6(2), March/April 1988 at pages 390 to 392. All such devices are complex and expensive. The problem remains to provide a simpler device which meets the requirements of resolution and stability, is operable in a UHV environment and may be implemented at lower cost than the high resolution devices which have heretofore been proposed.

A precision actuator which has been available is the Inchworm ® translator or motor. This device is sold by Burleigh Instruments, Inc., Burleigh Park, Fishers, New York 14453 U.S. It utilizes a piezoelectric driver which is attached or referenced to a housing. The driver drives a shaft which can be translated with controlled motion. The driver has a pair of piezoelectric clamp sections or elements and a piezoelectric extension section or element between the clamp elements. By applying voltages alternatively to the clamp elements and then applying voltages to the extension element so as to contract or expand that element, the shaft may be translated. The direction of travel of the shaft depends upon the sequence in which the voltages are applied to the clamp elements and the sequence of the application of voltages for obtaining expansion or contraction of the extension element. Further information as to Inchworm ® translators and systems may be obtained from product literature published by Burleigh Instruments, Inc. such as publication IW 2501080 which was published in 1983 and U.S. Pat. 3,902,084 issued to William G. May, Jr. on Aug. 26, 1975.

Inchworm translating devices are capable of resolution and stability of translation in the nanometer range, since the extension element may have control voltages applied thereto in steps (a staircase voltage) which can obtain such resolution. However, Inchworm motion has been adversely affected by movements when the clamping elements change position. These movements or "glitches" may be in the forward direction which in a STM could bring the specimen toward the scanning tip. Such motion may be in the micrometer range and can cause crashes. In addition the piezoelectric driver may be subject to creep when the actuating voltage is turned on and off. While creep is extremely small, the creep distances are significant when resolution in the nanometer range is desired. An additional problem resides in noise which can cause varying movement due to variations in the voltage applied to the extension element thereby adversely affecting the stability of positioning. In U.S. Pat. 3,902,085 issued Aug. 26, 1975 to R. A. Bizzigotti the problem of the "glitch" movement is discussed and the use of bridging members between the sections of the piezoelectric driver are suggested. It has been found that this approach does not provide the necessary elimination of the glitch effect during forward translation and stability to meet STM requirements.

It is the principal object of this invention to Provide an improved electromechanical translator, and especially a translator of the Inchworm ® translator type which provides high resolution and stability of the order necessary for STM applications by avoiding the problems of glitches when the clamping elements are actuated and released and which provides high stability in spite of creep and power supply variations.

Briefly described, an electromagnetic translator embodying the invention has a housing in which a shaft is moveable and a piezoelectric driver is located and referenced by connection thereof to the housing. It has been found in accordance with the invention that by locating the connection or reference point problems of glitches, creep and stability which have heretofore prevented the use of Inchworm translators in STM and like applications could be overcome. The driver is, in accordance with the invention connected to the housing in an area thereon which is spaced from the expansion section. This is preferably a section between the expansion section and one of the clamping sections in the direction of controlled motion (i.e. of the specimen toward the scanning tip in an STM). Accordingly, when voltage is applied to the clamping section for selective clamping, any glitch in the forward direction occurs only after a glitch in the rearward direction and therefore does not translate the specimen or the shaft further than specified on the last actuation of the extension element. The extension element is also isolated from the shaft which is clamped by the clamping element which is spaced away from the extension element in the direction of controlled motion of the shaft, such that creep and variations in length of the extension element (power supply noise) which could cause instability in the position within the resolution required are isolated from the shaft. The translator provided by the invention may be fabricated from ceramic and other materials compatible with the UHV environment and may be constructed at much lower cost than positioners used for coarse positioning purposes in STMs, such as those described in the publications referenced above. Accordingly, the improved Inchworm translator is especially suitable for use in STMs.

The foregoing and other objects, features and advantages of the invention as well as a preferred embodiment thereof will become more apparent from a reading of the following description in connection with the accompanying drawings in which:

FIG. 3 is a series of curves showing the motion profile versus time of the shaft and the clamping and extension of the device shown in FIG. 1;

FIG. 4 is of schematic presentations similar to FIG. 2 wherein the Inchworm translator is operated in a sequence where the extension element extends rather than retracts (which is the case illustrated in FIG. 2) in obtaining controlled motion of the shaft in the required direction (to the right as shown in FIG. 4);

FIG. 5 is a schematic view of an STM utilizing and Inchworm translator in accordance with the invention; and FIG. 6 is a curve showing the motion profile of the shaft of rm actuator during a plurality of sequences of selective clamp actuation and contraction and expansion of the extension element.

Figure 1:
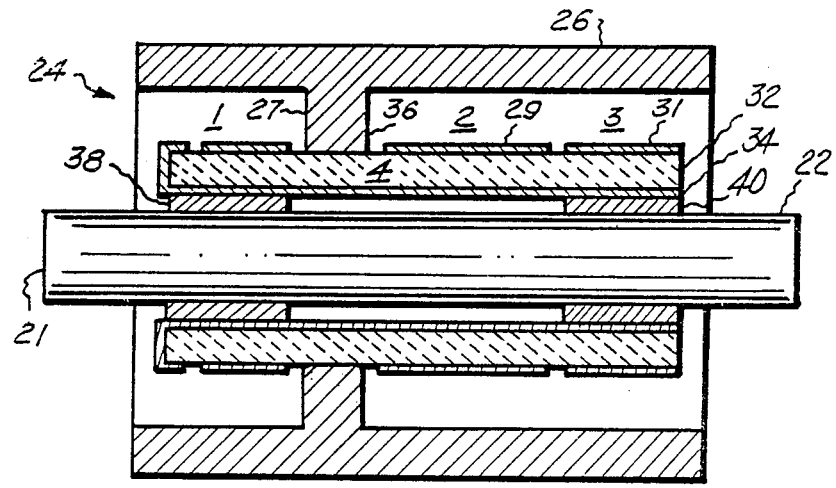
FIG. 1 is view diagramatically showing an improved, translator in accordance with the invention.

Referring first to FIG. 5 there is shown a STM 10 having a base 12 on which a tube scanner 14 having a scanning tip 16 is mounted. The tube scanner provides fine adjustments and scans the tip over a specimen which may be mounted on the face of a sample holder 18. The connector 20 is provided for applying a voltage between the tip and the sample. The sample holder 18 is mounted at the forward end of a shaft 22 of an Inchworm translator or motor 24. The housing 26 of the Inchworm motor is mounted on the base 12 by a suitable bracket 28. Connectors 30 for applying voltages to the electrodes of the clamping and extension elements are shown on the housing 26.

The Inchworm translator is shown in greater detail in FIG. 1. The parts including the shaft 22 are of cylindrical or tubular cross section. The housing 26 surrounds the shaft and a piezoelectric driver 32. This driver is a monolithic tube or cylinder of piezoelectric material such as PZT. The driver has four sections. There are clamping sections 1 and 3 and an extension section 2. These sections are defined by electrodes on the outer periphery of the tube 32. A common inner electrode 34 around the inner periphery of the tube 32 is used. This inner electrode curves over an end of the tube 32 and is spaced from the clamp electrode 27 in the longitudinal direction (axial direction) of the tube by a gap. Electrical connections (not shown) are made to the electrodes 27, 29 and 31 of the first clamping section, extension section 2 and clamping section 3, to leads (not shown) which may go to the connectors 30 (FIG. 5). There are therefore three axially spaced clamping and extension element sections of the piezoelectric driver. There is a fourth section between the forward clamping section 1 and the extension section 2. This fourth section is spaced from the extension section 2 and provides a surface for the connection and referencing of the housing to the piezoelectric driver such that the shaft, when the driver is actuated moves with respect to the housing 26. The fourth section may be glued with epoxy cement around the outer of the fourth section. The connection is shown as a ring 36 which is integral with the housing 26. Other forms of connection may be used such as illustrated in the May patent.

In the May patent and in the Inchworm translator, as heretofore provided, the connection was made to the extension element and preferably midway of the extension element.

It has been discovered in accordance with the invention that by moving the connection and referencing point to an area remote from the extension element the problems of glitches in the desired direction of controlled motion (towards the scanning tip 16 as shown in FIG. 5) as well as creep and power supply noise instability can be avoided.

Returning to FIG. 1, there are provided means whereby the extension element 2 will be spaced sufficiently far from the shaft 22 that it does not contact the shaft during extension or contraction. Contact of the shaft by the clamping elements 1 and 3 is provided by insertion of spacers, which may be metal sleeves attached to the inner electrode 34 in the location of the clamping elements 1 and 3. These spacers are shown at 38 and 40.

It is preferred to make the connection (locate the fourth element or section between the forward clamping element 1 and the extension element 2. Then the distance between the sample holder end (the forward end 21) of the shaft 22 will be closer to the housing thereby increasing the stiffness and increasing the resonant frequency of the mechanical system, thereby reducing or avoiding the need for vibration isolation mounting as has heretofore been necessary in STM coarse positioners. It will also be appreciated that the connection can be made directly to the clamping element 1, thereby avoiding the need for the section 4. Also the connection may be made on the opposite side of the extension element 2 than what is shown in FIG. 1 either to a section of the driver between the elements 2 and 3 or directly to element 3.

Figure 2:
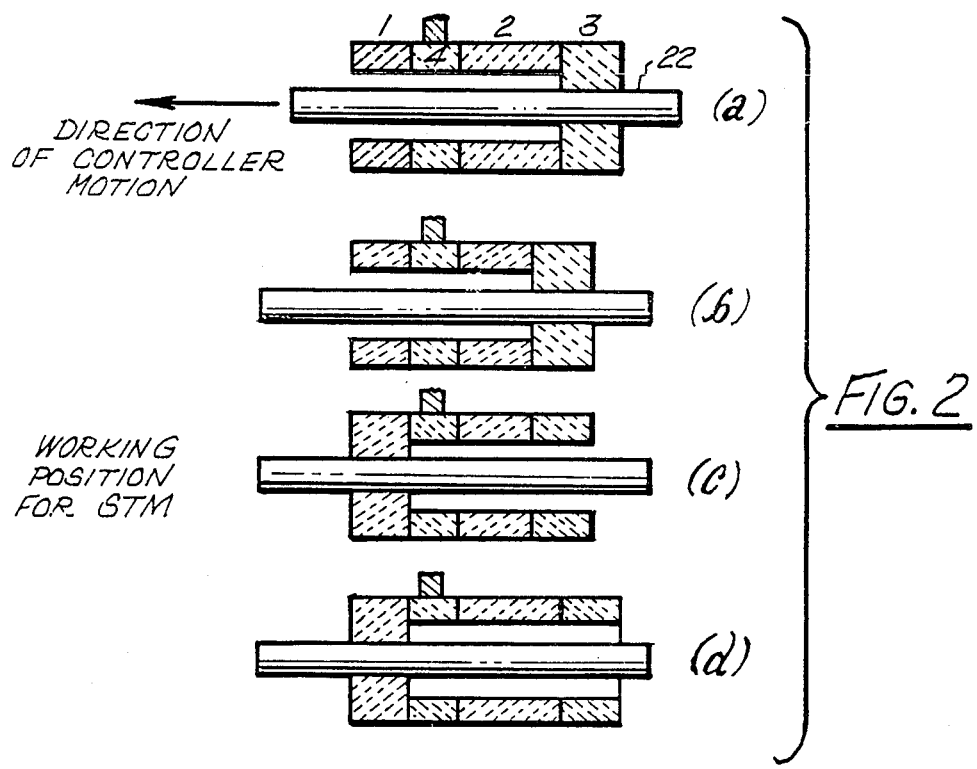
FIG. 2 is if schematic presentations of the device shown in FIG. 1 illustrating the sequence of operation thereof.

Referring to FIG. 2 and 3 it will be seen that in the first position indicated at (a) the rear clamp has been engaged, while the extension element 2 is extended. Then there is a slight movement in the direction of controlled motion (a glitch) of the shaft 22 as the piezoelectric tube expands. This glitch is shown at 40 and 41 in FIG. 3. The legend, clamp 3, is used to show that the clamping element 3 is actuated. This motion is compensated, however, and does not exceed the motion shown at 44 which is in the opposite direction which occurs when clamp 1 is actuated. The net motion in the direction of controlled motion (the forward direction or to the left as shown in FIG. 2) is not effected by the glitches as the clamping elements clamp and release. It may be desirable for the glitches in the forward direction (40 and 41) to be less than the motion due to the glitch 44 in the rearward direction. This may be accomplished by increasing the voltage on the electrodes of clamp 1 slightly with respect to the voltage on the clamp 3 electrodes. There also may be achieved by using a smaller diameter spacer 38 under clamp 1 than the spacer 40 under clamp 3.

In FIG. 2(b), clamp 3 has engaged and the expansion element 2 has contracted, thereby moving the shaft in the direction of controlled motion. This motion may be in steps of one nm in length as shown in FIG. 6. FIG. 6 shows four steps in the sequence of operation, i.e. clamping and releasing of the clamping sections which are similar to (a), (b), (c) and (d) of FIG. 2. It also shows the glitches and a slight rearward motion at 43 during the period between the release and engagement of the clamps 1 and 3. It will be appreciated that during this period, while the extension element extends as shown at (d) in FIG. 2, there is no motion of the shaft since the shaft is clamped only by the forward element 1 which is to the left of the connection 36. All expansion then is toward the right of the connection 36.

The working position for STM is as shown in FIG. 2(c). There the forward clamp 1 is engaged. Accordingly, creep at the beginning and end of the application of or removal of voltage from the extension element 3 does not affect the motion of the shaft. Similarly, variations in extension and retraction, such as due to power supply noise does not affect the motion of the shaft.

While not shown in FIG. 2, there is a period indicated in FIG. 3 where both clamps are engaged with the shaft. This further minimizes unwanted movement of the shaft as was explained in the May patent.

It will be appreciated that the shaft can be retracted by changing the sequence of application of clamping voltage and retraction voltage. The sequence will be reversed from that shown in FIG. 2.

FIG. 4 illustrates that controlled motion in the forward direction as shown by the arrow 45 may be obtained by a sequence wherein the extension element 2 extends rather than retracts. Then the forward clamp will be clamping element 3.

From the foregoing description it will be apparent that there has been provided an improved electromechanical translator and particularly a translator of the Inchworm type which affords the freedom from unwanted movements due to glitches, creep, and power supply perturbations which make it suitable for use in STM applications. Variations and modifications within the scope of the invention will undoubtedly suggest themselves to those skilled in the art. Accordingly, the foregoing description should be taken as illustrative and not in a limited sense.

I claim:

1. An electromechanical translator which comprises a housing, a shaft moveable with respect to said housing, a piezoelectric driver in said housing having a plurality of sections which expand and contract, said sections being disposed in end-to-end relationship, said sections including a first section spaced sufficiently from said shaft so that it remains out of contact with said shaft when it extends, and second and third sections each disposed facing an opposite end of said first section and sufficiently close to said shaft to clamp to said shaft upon expansion thereof, said driver being connected to said housing in an area thereon separate from said first section and spaced from one of the opposite ends of said first section, and means for applying voltages to said first section to change the length thereof and to said second and third sections for the selective clamping thereof to said shaft.

2. The translator according to claim 1 wherein said sections are sleeves of piezoelectric material around said shaft.

3. The translator according to claim 1 wherein said area of said driver is between said first section and the end of one of said second and third sections which is remote from said first section, and said connection to said housing is made only to said area.

4. The translator according to claim 1 wherein said driver has a nonexpandable, non-contractable fourth section which provides said area, said fourth section being between said first section and one of said second and third sections, said fourth section being connected to said housing.

5. The translator according to claim 2 wherein said first section and said second and third sections are the intermediate and end parts of said sleeve, respectively, said area being a fourth section of said sleeve disposed between said first part and one of said second and third sections, said fourth section being connected to said housing.

6. The translator according to claim 5 wherein said sleeve is a monolithic body of piezoelectric material, said first, second and third sections being defined by electrodes on inside and outside surfaces of said sleeve, and said fourth section being defined by the spacing between electrodes which define said first section and one of said second and third sections.

* * * * *